United States Patent
Chen et al.

(10) Patent No.: US 10,225,041 B2
(45) Date of Patent: Mar. 5, 2019

(54) METHODS AND APPARATUS FOR HIGHER MODULATION SUPPORT IN LTE

(71) Applicant: QUALCOMM Incorporated, San Diego, CA (US)

(72) Inventors: Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 15/351,731

(22) Filed: Nov. 15, 2016

(65) Prior Publication Data

US 2017/0207878 A1    Jul. 20, 2017

Related U.S. Application Data

(60) Provisional application No. 62/279,040, filed on Jan. 15, 2016.

(51) Int. Cl.
*H04L 1/00* (2006.01)
*H04L 5/00* (2006.01)
(Continued)

(52) U.S. Cl.
CPC .......... *H04L 1/0003* (2013.01); *H04L 1/0005* (2013.01); *H04L 1/0009* (2013.01);
(Continued)

(58) Field of Classification Search
CPC .......................... H04L 11/0003; H04L 11/0009
(Continued)

(56) References Cited

U.S. PATENT DOCUMENTS

| | | | |
|---|---|---|---|
| 2008/0152029 A1* | 6/2008 | Kwon | H04L 1/0004 375/260 |
| 2013/0044028 A1* | 2/2013 | Lea | H01Q 21/24 342/359 |
| 2013/0064228 A1 | 3/2013 | Jang et al. | |
| 2013/0114521 A1 | 5/2013 | Frenne et al. | |
| 2015/0296542 A1* | 10/2015 | Heo | H04W 74/0833 370/329 |

(Continued)

FOREIGN PATENT DOCUMENTS

| | | |
|---|---|---|
| EP | 2787670 A1 | 10/2014 |
| WO | WO-2015164251 A1 | 10/2015 |

OTHER PUBLICATIONS

International Search Report and Written Opinion—PCT/US2016/064596—ISA/EPO—dated Mar. 1, 2017.

*Primary Examiner* — Peter G Solinsky
(74) *Attorney, Agent, or Firm* — Patterson & Sheridan, LLP

(57) ABSTRACT

Certain aspects of the present disclosure relate to methods and apparatus for determining support for one or more modulation orders to use for the transmission of control channel(s) and data channel(s). In one aspect, a user equipment (UE) determines, based on at least three modulation and coding scheme (MCS) tables, a first modulation scheme to use for communications with a wireless device for a first subset of subframes, and a second modulation scheme to use for communications with the wireless device for a second subset of subframes. Each of the three MCS tables is associated with a different maximum modulation order. The UE monitors for a data channel transmitted in the first subset of subframes using the first modulation scheme. The UE monitors for a data channel transmitted in the second subset of subframes using the second modulation scheme.

28 Claims, 10 Drawing Sheets

(51) Int. Cl.
*H04W 8/06* (2009.01)
*H04L 12/26* (2006.01)
*H04W 24/02* (2009.01)
*H04W 72/04* (2009.01)

(52) U.S. Cl.
CPC .......... *H04L 1/0025* (2013.01); *H04L 5/0048* (2013.01); *H04L 5/0096* (2013.01); *H04L 43/16* (2013.01); *H04W 8/06* (2013.01); *H04W 24/02* (2013.01); *H04W 72/0413* (2013.01); *H04L 1/0038* (2013.01)

(58) Field of Classification Search
USPC .......................................................... 370/329
See application file for complete search history.

(56) References Cited

U.S. PATENT DOCUMENTS

| | | | |
|---|---|---|---|
| 2015/0312071 A1* | 10/2015 | Chen | H04L 1/0016 370/329 |
| 2016/0036618 A1* | 2/2016 | Einhaus | H04L 1/0003 370/329 |
| 2016/0135084 A1* | 5/2016 | Yi | H04W 76/023 370/466 |
| 2016/0135194 A1* | 5/2016 | Kim | H04B 7/0626 370/329 |
| 2016/0249244 A1* | 8/2016 | Xia | H04L 1/0023 |
| 2017/0214494 A1* | 7/2017 | Qiang | H04L 1/1819 |
| 2017/0265060 A1* | 9/2017 | Bin Sediq | H04W 8/205 |
| 2017/0295580 A1* | 10/2017 | Ji | H04W 72/082 |
| 2017/0366298 A1* | 12/2017 | Xu | H04L 1/0026 |
| 2018/0035430 A1* | 2/2018 | Futaki | H04W 72/0453 |

* cited by examiner

METHODS AND APPARATUS FOR HIGHER MODULATION SUPPORT IN LTE

CROSS-REFERENCE TO RELATED APPLICATION(S)

This application claims the benefit of U.S. Provisional Application Ser. No. 62/279,040, entitled, "METHODS AND APPARATUS FOR HIGHER MODULATION SUPPORT IN LTE," filed Jan. 15, 2016, assigned to the assignee hereof and hereby expressly incorporated by reference herein.

BACKGROUND

I. Field of the Disclosure

Certain aspects of the present disclosure generally relate to wireless communications, and more particularly, to determining one or more modulation orders to be used for the transmission of control channels and/or data channels.

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment. The method generally includes determining, based on at least three modulation and coding scheme (MCS) tables, a first modulation scheme to use for communications with a wireless device for a first subset of subframes and a second modulation scheme to use for communications with the wireless device for a second subset of subframes, wherein each of the three MCS tables is associated with a different maximum modulation order. The method also includes monitoring for a data channel transmitted in the first subset of subframes using the first modulation scheme. The method further includes monitoring for a data channel transmitted in the second subset of subframes using the second modulation scheme.

Certain aspects of the present disclosure provide a method for wireless communications by a base station. The method generally includes selecting, based on at least three MCS tables, a first modulation scheme to use for communications with a UE for a first subset of subframes and a second modulation scheme to use for communications with the UE for a second subset of subframes, wherein each of the three MCS tables is associated with a different maximum modulation order. The method also includes using the first modulation scheme for transmitting a data channel in the first subset of subframes. The method further includes using the second modulation scheme for transmitting a data channel in the second subset of subframes.

Certain aspects of the present disclosure provide a method for wireless communications by a user equipment. The method generally includes determining, based on one or more conditions, a maximum modulation order for a wireless device to transmit at least one control channel. The method also includes monitoring for the at least one control channel transmitted by the wireless device at a modulation scheme with a corresponding modulation order at or below the determined maximum modulation order.

Certain aspects of the present disclosure provide a method for wireless communications by a base station. The method generally includes determining, based on one or more conditions, a maximum modulation order for transmitting at least one control channel. The method also includes selecting a modulation scheme with a corresponding modulation order at or below the determined maximum modulation order. The method further includes transmitting the at least one control channel using the selected modulation scheme.

Certain aspects of the present disclosure provide an apparatus for wireless communications. The apparatus generally includes means for determining, based on at least three MCS tables, a first modulation scheme to use for communications with a wireless device for a first subset of subframes and a second modulation scheme to use for communications with the wireless device for a second subset of subframes, wherein each of the three MCS tables is associated with a different maximum modulation order. The apparatus also includes means for monitoring for a data channel transmitted in the first subset of subframes using the first modulation scheme. The apparatus further includes means for monitoring for a data channel transmitted in the second subset of subframes using the second modulation scheme.

Certain aspects of the present disclosure provide an apparatus for wireless communications. The apparatus generally includes means for selecting, based on at least three MCS tables, a first modulation scheme to use for communications with a UE for a first subset of subframes and a second modulation scheme to use for communications with the UE for a second subset of subframes, wherein each of the three MCS tables is associated with a different maximum modulation order. The apparatus also includes means for using the first modulation scheme for transmitting a data channel in the first subset of subframes. The apparatus further includes means for using the second modulation scheme for transmitting a data channel in the second subset of subframes.

Certain aspects of the present disclosure provide an apparatus for wireless communications. The apparatus generally includes means for determining, based on one or more conditions, a maximum modulation order for a wireless device to transmit at least one control channel. The apparatus also includes means for monitoring for the at least one control channel transmitted by the wireless device at a modulation scheme with a corresponding modulation order at or below the determined maximum modulation order.

Certain aspects of the present disclosure provide an apparatus for wireless communications. The apparatus generally includes means for determining, based on one or more conditions, a maximum modulation order for transmitting at least one control channel. The apparatus also includes means for selecting a modulation scheme with a corresponding modulation order at or below the determined maximum modulation order. The apparatus further includes means for transmitting the at least one control channel using the selected modulation scheme.

Certain aspects of the present disclosure provide an apparatus for wireless communications. The apparatus generally includes at least one processor and a memory coupled to the at least one processor. The at least one processor is configured to determine, based on at least three MCS tables, a first modulation scheme to use for communications with a wireless device for a first subset of subframes and a second modulation scheme to use for communications with the wireless device for a second subset of subframes, wherein each of the three MCS tables is associated with a different maximum modulation order. The at least one processor is also configured to monitor for a data channel transmitted in the first subset of subframes using the first modulation scheme. The at least one processor is further configured to monitor for a data channel transmitted in the second subset of subframes using the second modulation scheme.

Certain aspects of the present disclosure provide an apparatus for wireless communications. The apparatus generally includes at least one processor and a memory coupled to the at least one processor. The at least one processor is configured to select, based on at least three MCS tables, a first modulation scheme to use for communications with a UE for a first subset of subframes and a second modulation scheme to use for communications with the UE for a second subset of subframes, wherein each of the three MCS tables is associated with a different maximum modulation order. The at least one processor is also configured to use the first modulation scheme for transmitting a data channel in the first subset of subframes. The at least one processor is further configured to use the second modulation scheme for transmitting a data channel in the second subset of subframes.

Certain aspects of the present disclosure provide an apparatus for wireless communications. The apparatus generally includes at least one processor and a memory coupled to the at least one processor. The at least one processor is configured to determine, based on one or more conditions, a maximum modulation order for a wireless device to transmit at least one control channel. The at least one processor is also configured to monitor for the at least one control channel transmitted by the wireless device at a modulation scheme with a corresponding modulation order at or below the determined maximum modulation order.

Certain aspects of the present disclosure provide an apparatus for wireless communications. The apparatus generally includes at least one processor and a memory coupled to the at least one processor. The at least one processor is configured to determine, based on one or more conditions, a maximum modulation order for transmitting at least one control channel. The at least one processor is also configured to select a modulation scheme with a corresponding modulation order at or below the determined maximum modulation order. The at least one processor is further configured to transmit the at least one control channel using the selected modulation scheme.

Certain aspects of the present disclosure provide a computer-readable medium having computer executable code stored thereon. The computer-readable medium generally includes code for determining, based on at least three MCS tables, a first modulation scheme to use for communications with a wireless device for a first subset of subframes and a second modulation scheme to use for communications with the wireless device for a second subset of subframes, wherein each of the three MCS tables is associated with a different maximum modulation order. The computer-readable medium also includes code for monitoring for a data channel transmitted in the first subset of subframes using the first modulation scheme. The computer-readable medium further includes code for monitoring for a data channel transmitted in the second subset of subframes using the second modulation scheme.

Certain aspects of the present disclosure provide a computer-readable medium having computer executable code stored thereon. The computer-readable medium generally includes code for selecting, based on at least three MCS tables, a first modulation scheme to use for communications with a UE for a first subset of subframes and a second modulation scheme to use for communications with the UE for a second subset of subframes, wherein each of the three MCS tables is associated with a different maximum modulation order. The computer-readable medium also includes code for using the first modulation scheme for transmitting a data channel in the first subset of subframes. The computer-readable medium further includes code for using the second modulation scheme for transmitting a data channel in the second subset of subframes.

Certain aspects of the present disclosure provide a computer-readable medium having computer executable code stored thereon. The computer-readable medium generally includes code for determining, based on one or more conditions, a maximum modulation order for a wireless device to transmit at least one control channel. The computer-readable medium also includes code for monitoring for the at least one control channel transmitted by the wireless device at a modulation scheme with a corresponding modulation order at or below the determined maximum modulation order.

Certain aspects of the present disclosure provide a computer-readable medium having computer executable code stored thereon. The computer-readable medium generally includes code for determining, based on one or more conditions, a maximum modulation order for transmitting at least one control channel. The computer-readable medium also includes code for selecting a modulation scheme with a corresponding modulation order at or below the determined maximum modulation order. The computer-readable medium further includes code for transmitting the at least one control channel using the selected modulation scheme.

Numerous other aspects are provided including methods, apparatus, systems, computer program products, and processing systems. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate certain typical aspects of this disclosure and are therefore not to be considered limiting of its scope, for the description may admit to other equally effective aspects.

DETAILED DESCRIPTION

Figure 1:
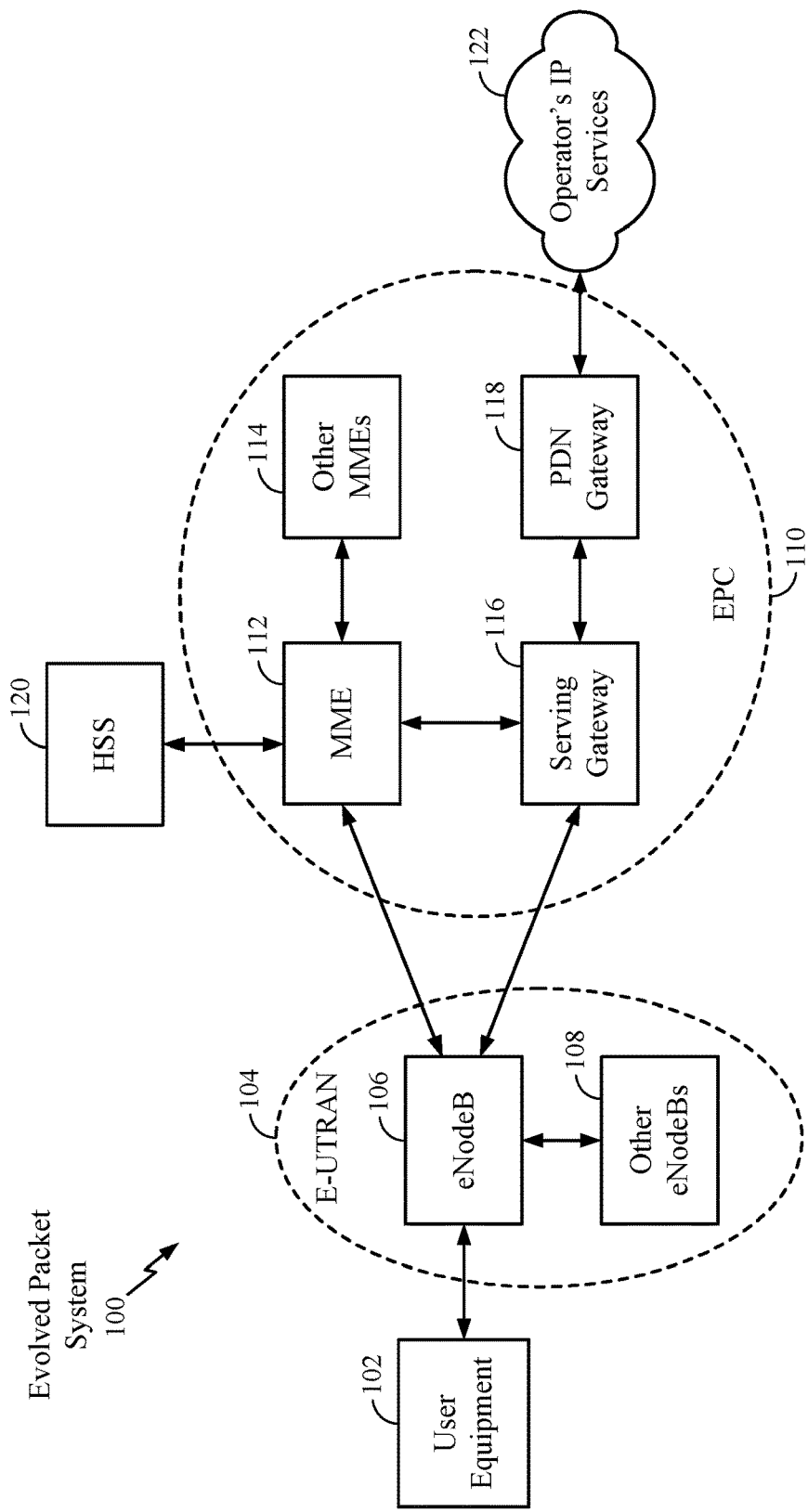
FIG. 1 is a diagram illustrating an example of a network architecture, in accordance with certain aspects of the present disclosure.

Aspects of the present disclosure provide techniques and apparatus for supporting higher modulation orders for communications in a wireless communication network (e.g., such as LTE). "LTE" refers generally to LTE, LTE Advanced (LTE A), LTE in an unlicensed spectrum (LTE whitespace), etc.

As described below, a wireless device (e.g., such as a user equipment (UE), base station (BS), etc.) may be capable of using several modulation orders, such as modulation orders based on quadrature phase shift keying (QPSK), quadrature amplitude modulation (QAM), etc., for communications in the network (e.g., the transmission/reception of control and/or data channels). In some cases, the wireless device (e.g., a UE) may use at least three modulation and coding scheme (MCS) tables to determine which modulation scheme to use for monitoring for data channels transmitted by another wireless device (e.g., a BS). For example, the wireless may use one of the MCS tables associated with a first maximum modulation order to monitor for a data channel transmitted in a first subset of subframes, and use another one of the MCS tables associated with a second maximum modulation order to monitor for a data channel transmitted in a second subset of subframes.

Additionally, or alternatively, a wireless device (e.g., UE, BS) may be capable of determining, based on one or more conditions, a maximum modulation order to use for the transmission of control channels (e.g., physical downlink control channels (PDCCHs), enhanced PDCCHs (ePDCCHs), etc.). For example, in some cases, the wireless device may determine that a higher modulation order (e.g., such as a modulation based on QAM as opposed to a QPSK based modulation or BPSK modulation) is supported for the transmission of control channels. The wireless device may determine support for the higher modulation order based on one or more parameters associated with downlink control information (DCI) that is transmitted within the control channel(s). Once determined, the wireless device may select a modulation scheme that has a corresponding modulation order at or below the determined higher modulation order. The wireless device may transmit the control channel(s) using the selected modulation scheme.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced. For example, a BS/evolved Node B (e.g., 106, 108, etc.) and/or UE 102 may determine that a higher modulation order (e.g., 1024 QAM as opposed to 256 QAM or 64 QAM) is supported for the transmission/reception of data and/or control channels.

In one aspect, the eNBs 106, 108 and/or UE may determine that a higher modulation order is supported for the transmission of data channels (e.g., by the eNBs 106, 108 to UE 102), based on at least three MCS tables. For example, each of the three MCS tables may be associated with a different maximum modulation order. The eNBs 106, 108 and/or UE 102 may select one or more modulation schemes to use for transmission/reception of data channels based on the at least three MCS tables.

Additionally, or alternatively, in one aspect, the eNBs 106, 108 and/or UE 102 may determine, based on one or more conditions, a maximum modulation order that is supported for the transmission of control channel(s) by the eNB 106, 108 etc., to the UE(s) 102. As described in more detail below, the one or more conditions may be based on control information that is transmitted within the control channel(s). Referring to some examples, the eNBs 106, 108 and/or UE 102 may make the determination based on the particular format of the control information (e.g., which DCI format is used), a coding rate for the control information, one or more aggregation level(s) used for the control information, which search space (e.g., common search space, UE-specific search space, etc.) the control information is transmitted in, the type of identifier that is used to scramble the control information, etc.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
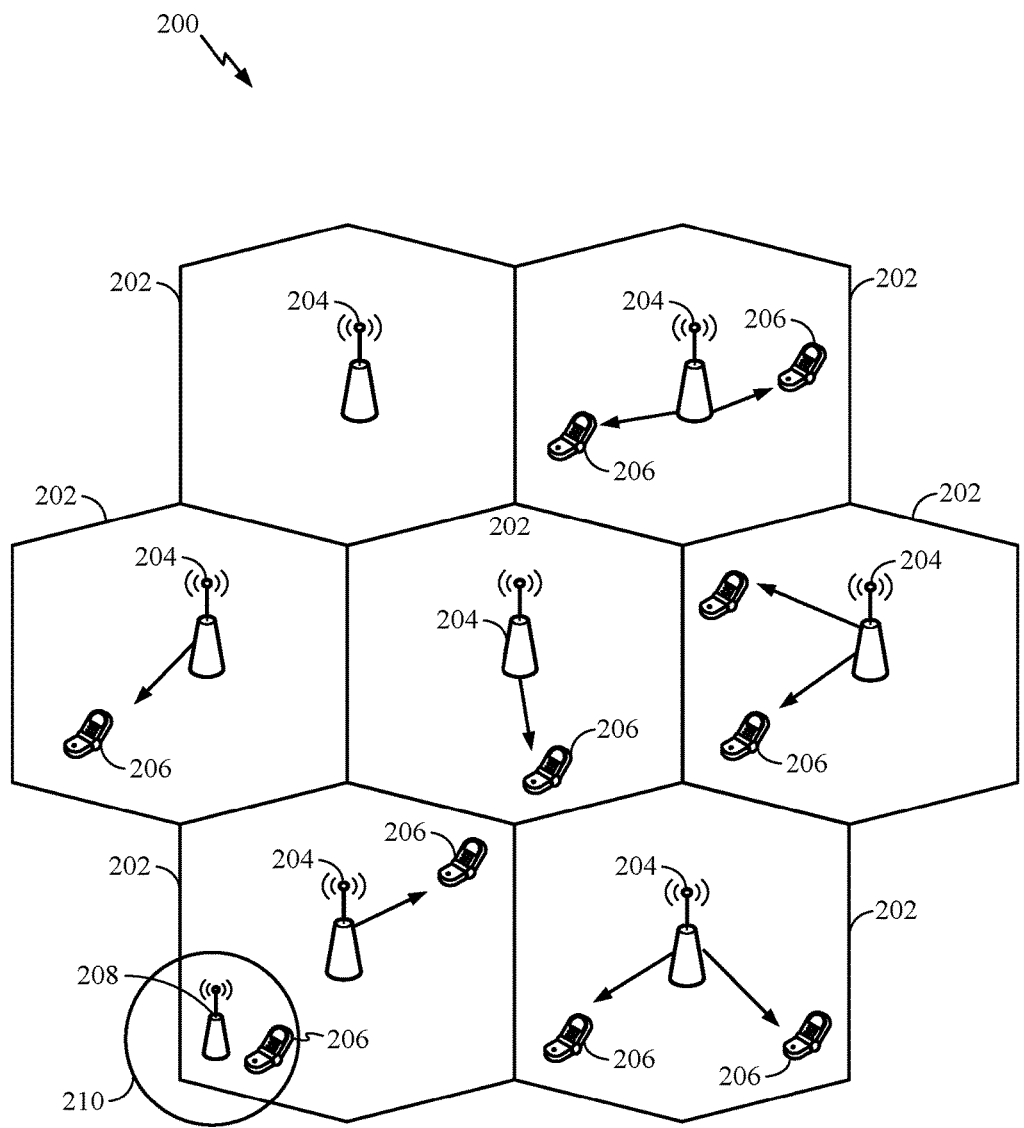
FIG. 2 is a diagram illustrating an example of an access network, in accordance with certain aspects of the present disclosure.

FIG. 2 is a diagram illustrating an example of an access network 200 in an LTE network architecture in which aspects of the present disclosure may be practiced. For example, eNBs 204 and UEs 206 may be configured to implement techniques for determining a maximum modulation order for the transmission/reception of control channel(s) and/or data channel(s), in accordance with certain aspects of the present disclosure as discussed below.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDM. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
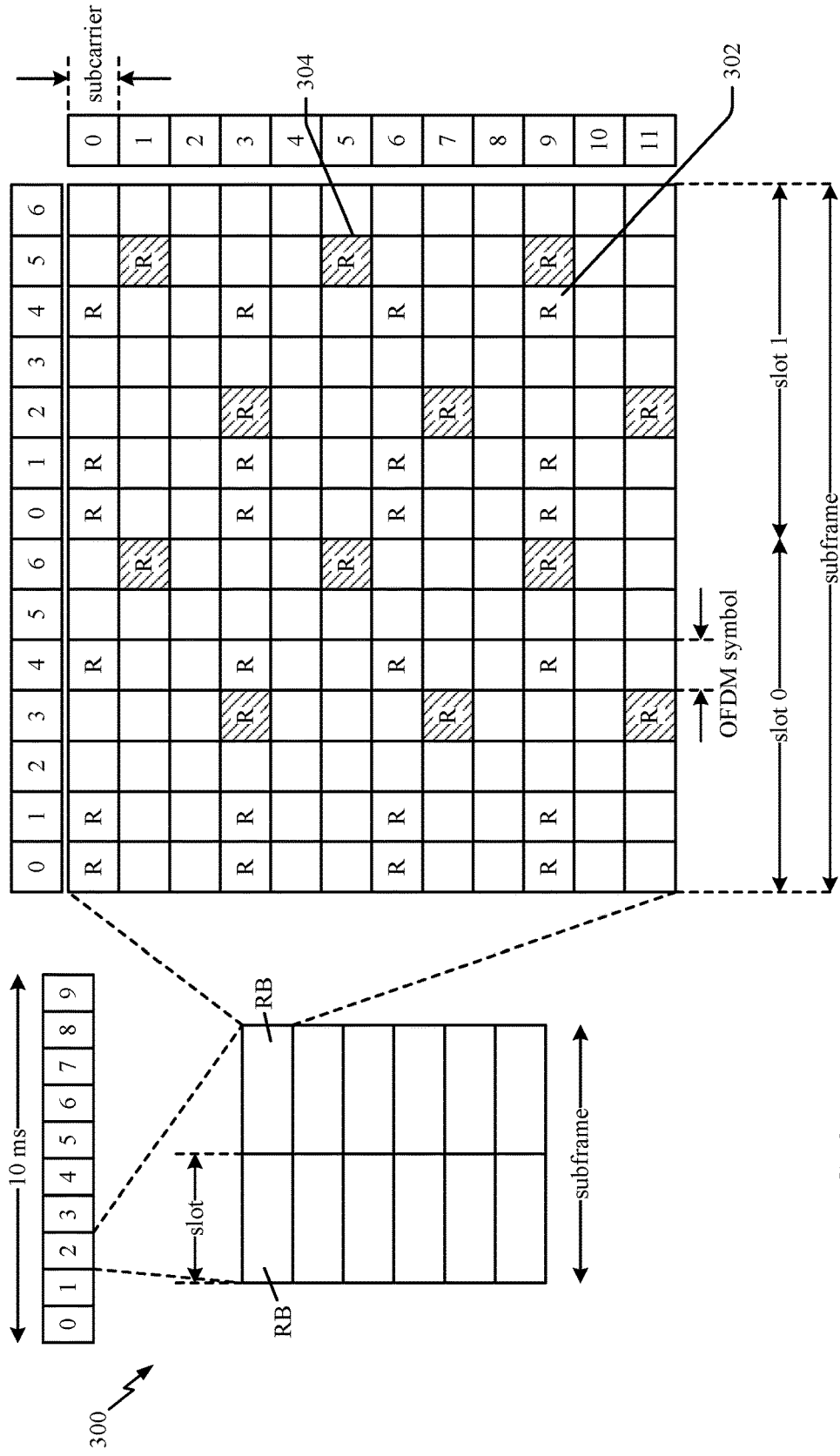
FIG. 3 is a diagram illustrating an example of a DL frame structure in LTE, in accordance with certain aspects of the present disclosure.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. For example, the PDCCH may include downlink control information (DCI), which carries control information for both downlink and uplink transmissions, such as for example, downlink scheduling assignments, uplink scheduling grants, power control commands, information for decoding/demodulating symbols in the downlink, information for encoding/modulating symbols in the uplink, etc.

The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. REGs may further be arranged into control channel elements (CCEs). Each CCE may include nine REGs. Thus, one CCE equals 36 REs. The REGs may be distributed across one or more symbols periods (e.g., first one, two, three, etc., symbol periods) and/or the system bandwidth through interleaving.

The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2.

The PDCCH may occupy one or more CCEs. The number of CCEs in a PDCCH generally refers to the PDCCH's aggregation level. The PDCCH may use aggregation level 1, 2, 4, 8, 16, 32, etc. (corresponding to 9, 18, 36, 72, 144, 288 REGs, etc., which may be selected from the available REGs, in the first M symbol periods, for example). Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
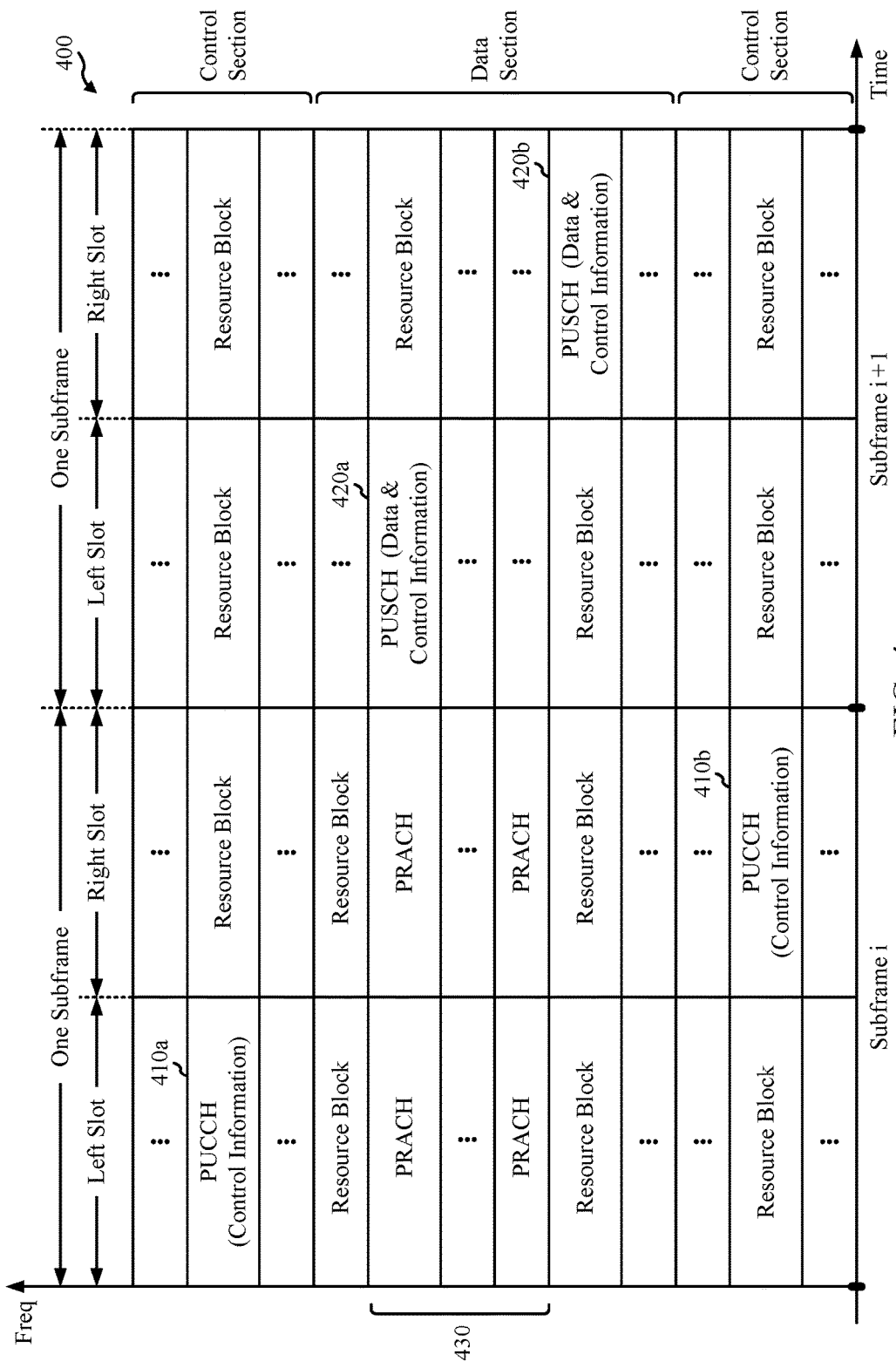
FIG. 4 is a diagram illustrating an example of an UL frame structure in LTE, in accordance with certain aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
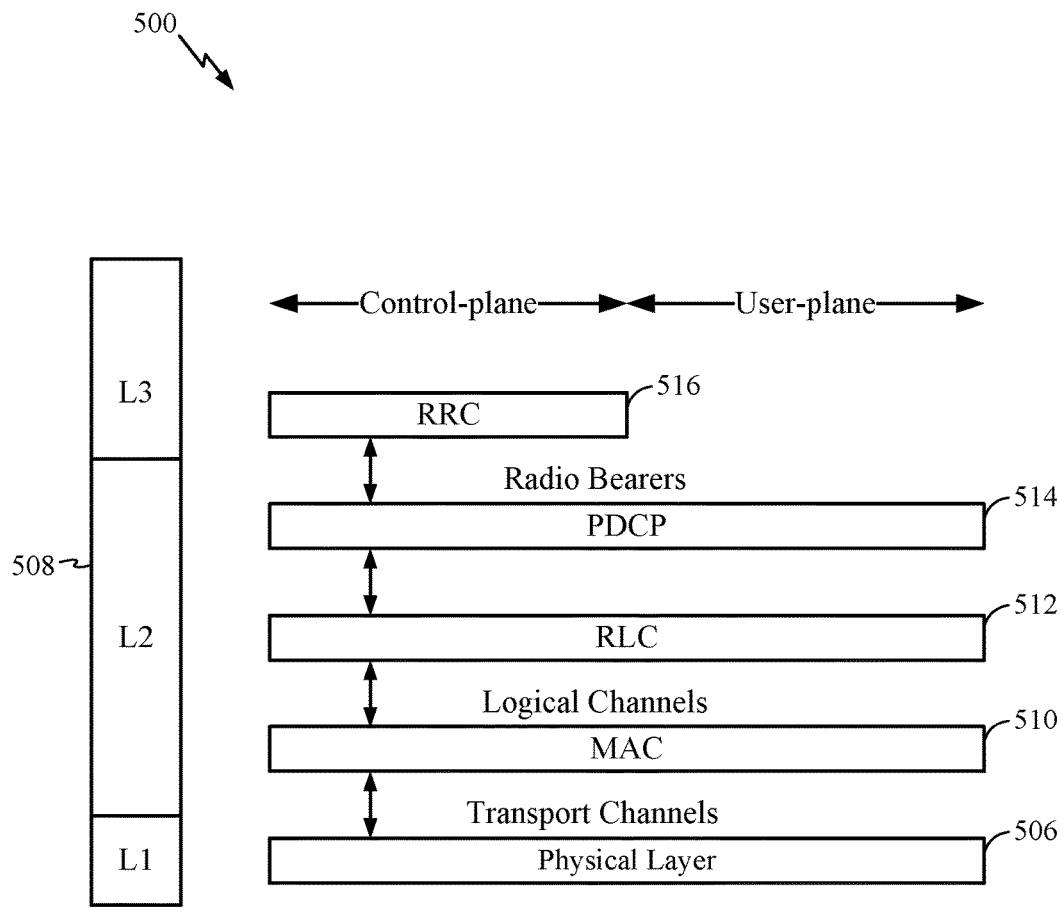
FIG. 5 is a diagram illustrating an example of a radio protocol architecture for the user and control plane, in accordance with certain aspects of the present disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
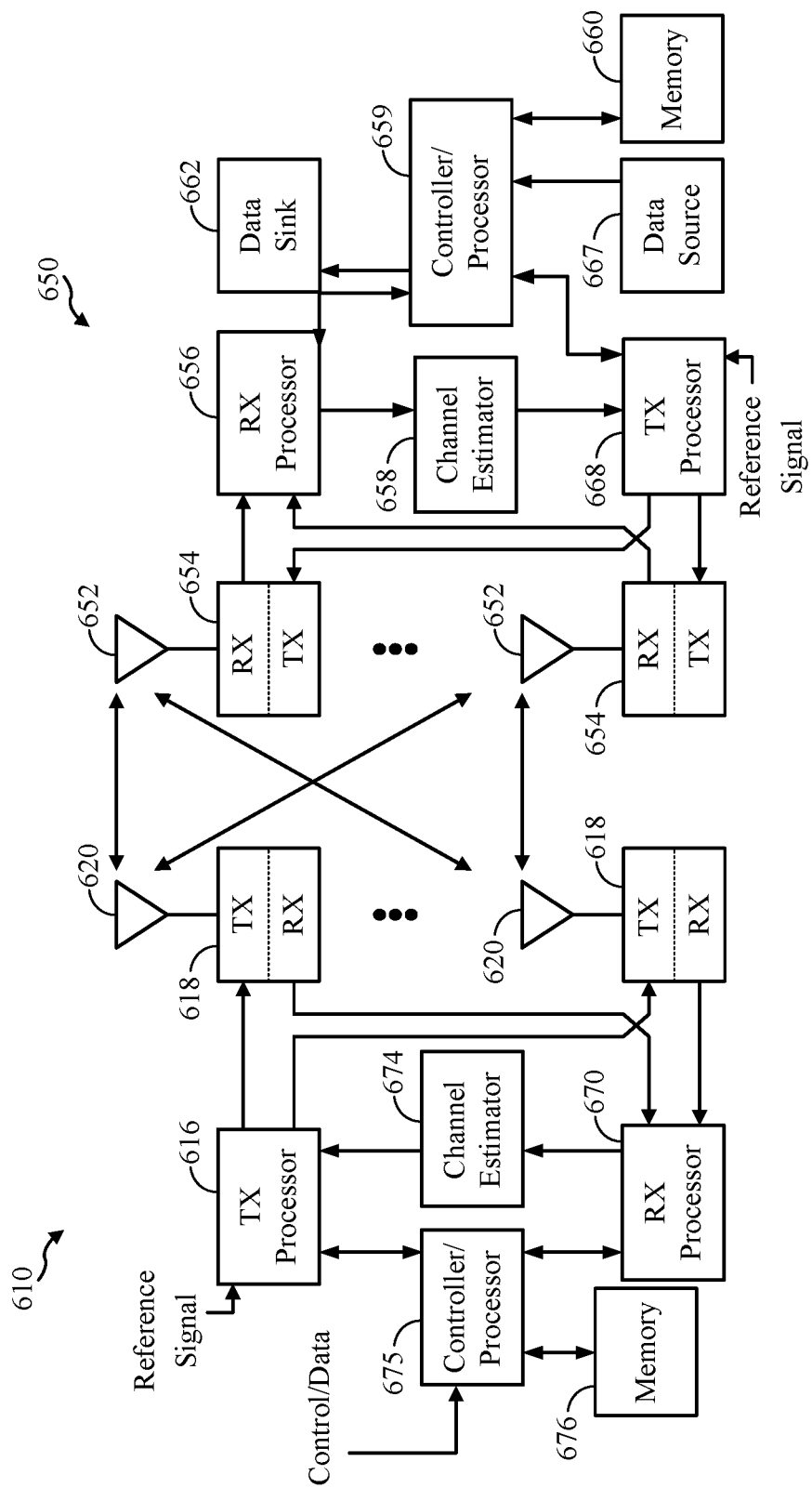
FIG. 6 is a diagram illustrating an example of an evolved Node B and user equipment in an access network, in accordance with certain aspects of the disclosure, in accordance with certain aspects of the present disclosure.

FIG. 6 is a block diagram of an eNB 610 in communication with a UE 650 in an access network, in which aspects of the present disclosure may be practiced.

In some aspects, eNB 610 and/or UE 650 may determine one or more modulation schemes (e.g., MCS) to use for transmission/reception of data channel(s) based on at least three MCS tables, where each MCS table is associated with a different maximum modulation order. In one example, UE 650 can determine a first modulation scheme from one of the MCS tables associated with a first maximum modulation order (e.g., 64 QAM, 256 QAM, or 1024 QAM) to use for monitoring for data channel(s) transmitted by the eNB 610 during a first subset of subframes, and determine a second modulation scheme from another one of the MCS tables associated with a second maximum modulation order to use for monitoring for data channel(s) transmitted by the eNB 610 during a second subset of subframes.

Additionally, or alternatively, in some aspects, eNB 610 and/or UE 650 may determine a maximum modulation order for the transmission of control channel(s) based on one or more conditions. Once determined, the eNB 610, for example, may select a modulation scheme (MCS) with a corresponding modulation order at or below the determined maximum modulation order. The eNB 610 may select the MCS for each UE 650 based on channel quality indicators (CQIs) received from the UE 650, process (e.g., encode and modulate) the control data for each UE based on the MCS(s) selected for the UE, and transmit control information in the control channel(s) using the selected MCS(s).

Similarly, once the UE 650 determines the maximum modulation order for the eNB 610 to transmit the control channel(s), the UE 650 may monitor for the control channel(s) transmitted by the eNB 610 at a MCS at or below the determined maximum modulation order. The particular MCS used by the UE 650 may be based on one or more CQI(s) provided to the eNB 610.

Referring to the eNB 610, in the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 7:
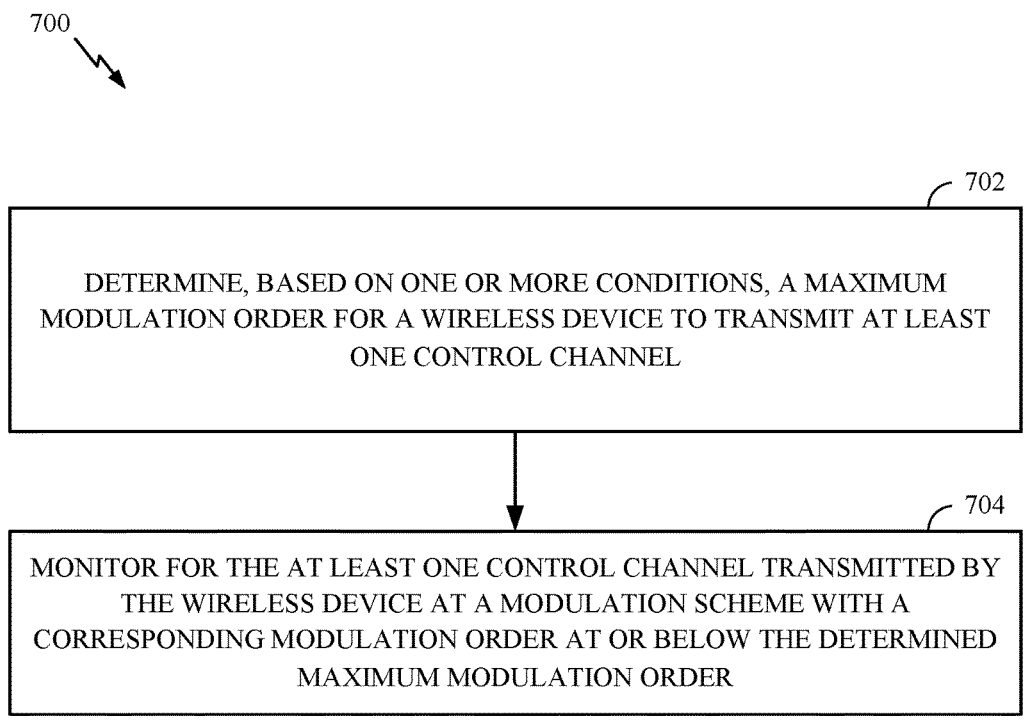
FIG. 7 illustrates example operations that may be performed by a user equipment, in accordance with certain aspects of the present disclosure.
Figure 8:
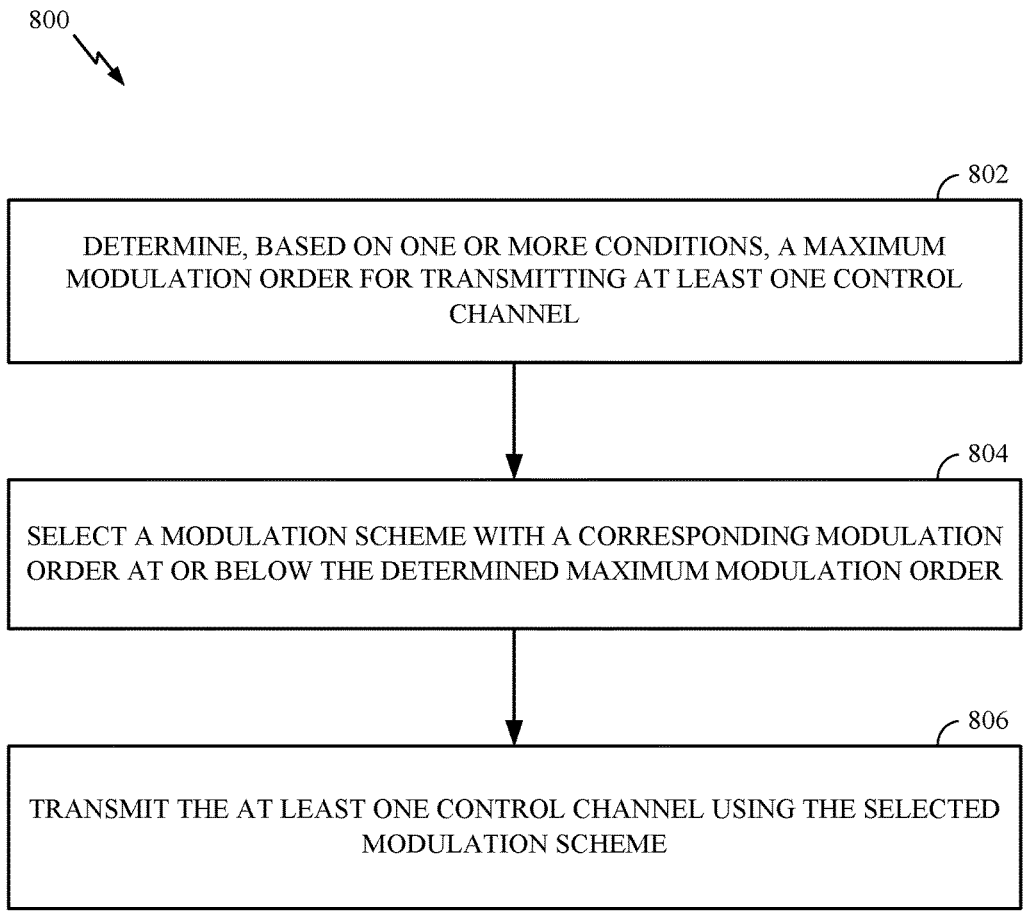
FIG. 8 illustrates example operations that may be performed by a base station, in accordance with certain aspects of the present disclosure.
Figure 9:
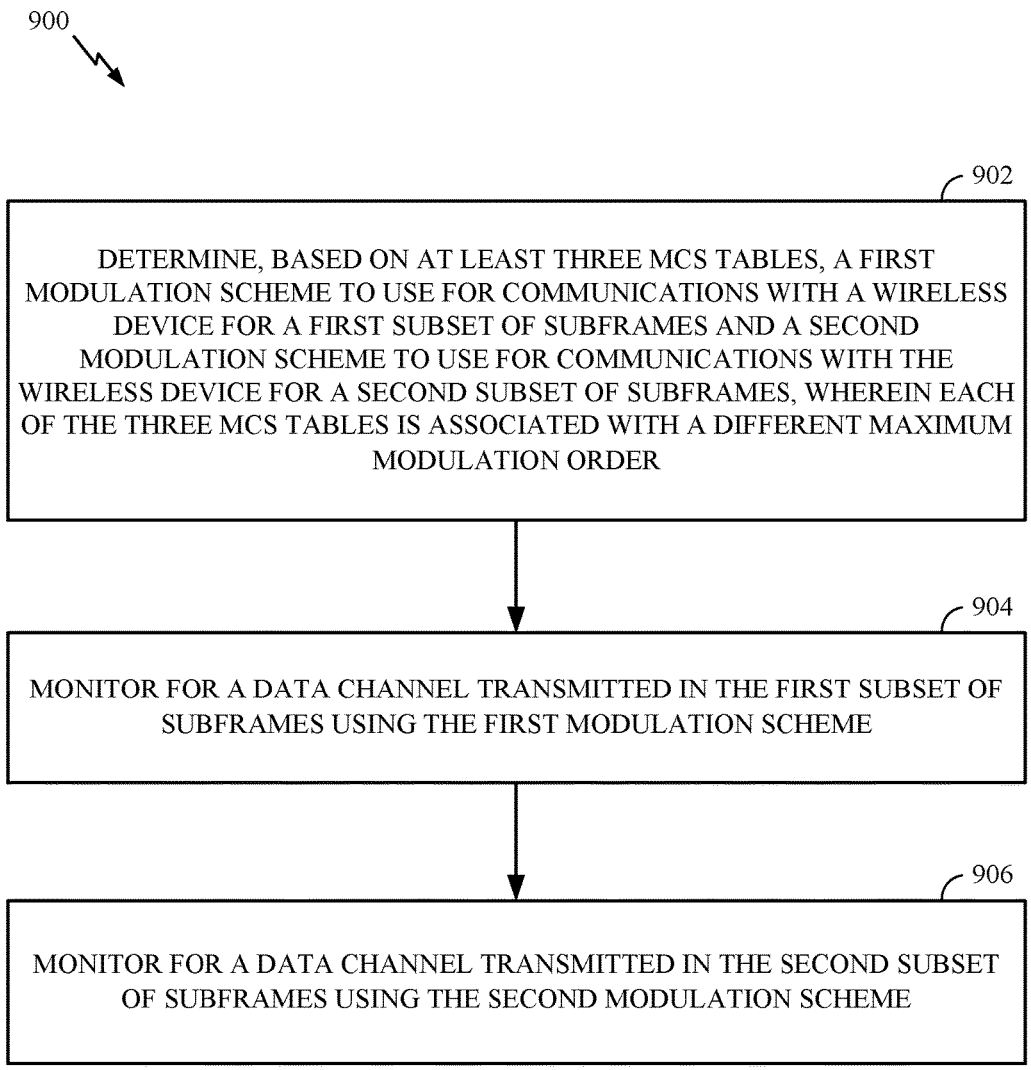
FIG. 9 illustrates example operations that may be performed by a user equipment, in accordance with certain aspects of the present disclosure.
Figure 10:
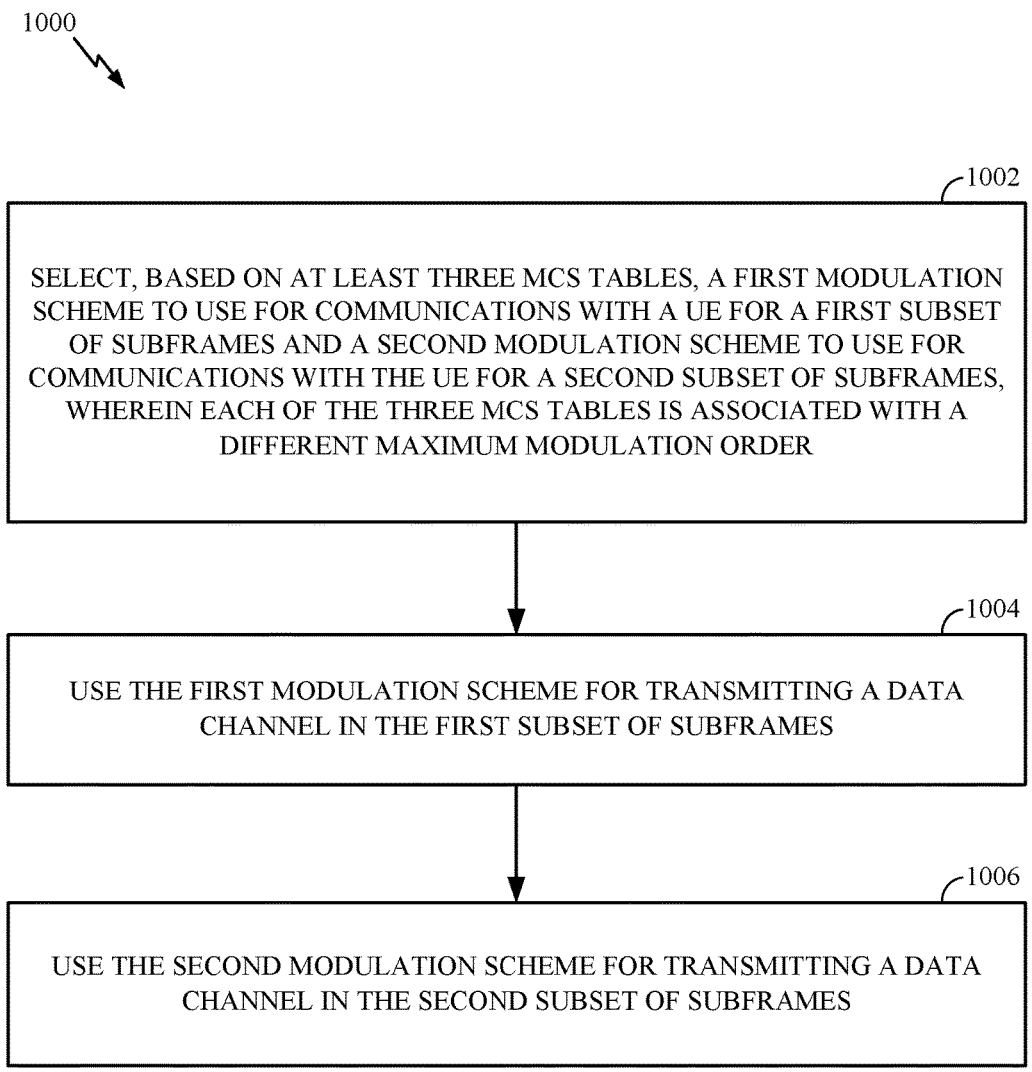
FIG. 10 illustrates example operations that may be performed by a base station, in accordance with certain aspects of the present disclosure.

The controller/processor 675 and/or other processors and modules at the eNB 610 may perform or direct operations, for example, operations 800 in FIG. 8, operations 1000 in FIG. 10, and/or other processes for the techniques described herein. The controller/processor 659 and/or other processors and modules at the UE 650 may perform or direct operations, for example, operations 700 in FIG. 7, operations 900 in FIG. 9, and/or other processes for the techniques described herein. In certain aspects, one or more of any of the components shown in FIG. 6 may be employed to perform example operations 700, 800, 900 and 1000 and/or other processes for the techniques described herein. The memories 660 and 676 may store data and program codes for the UE 650 and eNB 610 respectively, accessible and executable by one or more other components of the UE 650 and the eNB 610.

Example Modulation Support in LTE

In wireless communication systems (e.g., such as LTE) various modulation schemes, such as BPSK, QPSK, M-PSK, M-QAM, etc., may be supported for downlink and/or uplink transmissions. LTE (Release-11 and earlier), for example, may support modulation orders up to 64 QAM. In these systems, BPSK, QPSK and 16 QAM may be supported in uplink and downlink directions, whereas 64 QAM may be supported in the downlink direction. A transmitting wireless device (e.g., BS, UE, etc.) may use a MCS field (e.g., within DCI) to indicate the modulation order to another wireless device. A five bit MCS field may be supported in both DL and UL scheduling grants (e.g., within DCI), and may provide up to twenty-nine different MCSs for efficient rate adaptation.

Based on the MCS index value indicated from the MCS field, the UE may determine the number of spatial streams, modulation type, coding rate, and data rate for a given transmission. MCS indices 0-28 may provide explicit MCS schemes and may be used for both new and re-transmissions. MCS indices 29, 30 and 31 may provide implicit MCS schemes and may be used for re-transmissions.

To enable rate adaptation, and in light of a five bit MCS, the wireless communication system may also support a four bit CQI report. For example, the UE may use the four bit CQI report to report sixteen possible channel conditions experienced by the UE. Based on the reported CQI, the eNB can schedule up to 29 possible MCS schemes for the UE. In some cases, the MCS may also be used for transport block size (TBS) lookup. For example, each MCS may be mapped to a TBS lookup index. In addition, the MCS index may be further combined with the number of assigned resource blocks for TBS lookup.

Wireless communication systems (e.g., such as LTE Release 12 (Rel-12) and beyond) may support modulation orders that are higher relative to those supported in earlier releases of LTE. For example, Rel-12 may support up to 256 QAM for downlink transmissions. Such a modulation order (e.g., 256 QAM) may be used in small cell deployments, e.g., when a UE is likely to experience very good channel conditions.

With the support for 256 QAM, new CQI, MCS, and/or TBS tables may be defined. For example, new CQI tables may be defined to support CQI feedback with 256 QAM entries. New MCS tables may be defined to support scheduling of PDSCH with 256 QAM. New TBS tables may be defined to support a larger TBS and therefore a higher peak rate. However, even with these new tables defined, the wireless communication system may associate a subset of DCI formats with legacy tables while using the new tables for the remaining DCI formats. For example, DCI format 1A/1C may be associated with the legacy MCS table (i.e., not supporting 256 QAM PDSCH scheduling) while the other DCI formats used for scheduling PDSCH may use the new MCS tables (i.e., supporting 256 QAM PDSCH scheduling). Further, in some cases, 256 QAM PDSCH scheduling may be supported for C-RNTI based PDSCH transmissions and may not be supported for SPS-RNTI based PDSCH transmissions. 256 QAM may also be supported for broadcast channels (e.g., Physical Multicast Channel (PMCH), etc.).

In some cases, UE(s) may be configured to use a combination of different CQI/MCS tables, e.g., such as a 64 QAM based CQI/MCS table and a 256 QAM based CQI/MCS table, for decoding/demodulating data channel (e.g., PDSCH) transmissions. For DL transmission modes 1 to 9, the CQI table may be dependent on the set of subframes (within a radio frame period) configured for the UE. For example, if there are two CQI subframe sets, the first set may be associated with a legacy CQI table, and the second set may be associated with a new CQI table.

In LTE, control channel(s) may be in the form of legacy control channels (e.g., PDCCH), enhanced control channels (e.g., ePDCCH), a machine-type-communication PDCCH (mPDCCH), etc. In some embodiments, e.g., in LTE Release 14 (Rel-14) certain devices may support low latency (or ultra low latency "ULL") capability, including the capability to perform certain procedures with low latency relative to devices that lack the capability (e.g., "legacy" devices). In such cases, control channel(s) for low latency operation with shortened TTI (e.g., less than 1 ms) may also be used.

As mentioned above, a BS generally notifies UEs of scheduling grants for uplink and downlink transmissions via downlink control information (DCI), which is included in the control channel(s) transmitted to UE(s). For these control channel(s), one or more search spaces may be defined, where each search space includes a set of decoding candidates with one or more aggregation levels. Each aggregation level generally represents a certain number of resource elements for the control channel transmission. For legacy PDCCH, for example, an aggregation level L may include L CCEs, where each CCE includes 36 REs. For ePDCCH, each aggregation level L may include L enhanced CCEs (eCCEs), where each eCCE includes 36 nominal REs (but some of the REs may not be available for an ePDCCH transmission). Thus, with ePDCCH, the number of actual REs for an ePDCCH transmission in one eCCE may be less than 36. For control channel(s) used with low latency operation, the aggregation level(s) may have different CCE sizes. The possible aggregation levels may include 1, 2, 4, 8, 16, 32, etc. For each aggregation level, there may be one or more decoding candidates.

A UE monitors the search spaces (e.g., common search space, UE-specific search space, etc.) in order to detect control channel(s) directed to the UE. In some cases, since the number of CCEs for each of the control channel(s) may vary and may not be signaled, a UE may attempt to blindly decode the control channel(s) in the search spaces. For each aggregation level, each UE may try to decode more than one possible candidate. For each decoding candidate, there may be one or more DCI sizes. For example, there may be one size for DCI format 1A/0, and another size for DCI format 2. For DCI associated with SIMO operation, the DCI size is typically in the range of 30-50 bits. For DCI associated with MIMO operation, the DCI size is much larger (e.g., 60 to 70 bits, or more). Therefore, the number of blind decodes may be a function of a number of decoding candidates and, for each decoding candidate, the possible DCI size(s).

Higher Modulation Support

As mentioned above, there has been interest to further enhance a wireless communication system's support for higher orders of modulation (e.g., 1024 QAM in DL, 256 QAM in UL, etc.). Currently, however, control channel(s) are typically associated with QPSK modulation. QPSK based modulation for control channels, therefore, may not be consistent with the increasing need to support higher modulation orders (e.g., 256 QAM, 1024 QAM, 4096 QAM, etc.). In one case, for example, QPSK based modulation may not be desirable for MIMO DCI formats, where the DCI size is in the range of ~60 bits to 70+ plus bits.

With MIMO DCI formats, for aggregation level 1, even when all 36 REs are available for MIMO DCI, the coding rate for the control channel may be close to 1 or larger than 1. For example, a 60-bit MIMO DCI has a coding rate of 60/36 (REs/CCE)/2 (QPSK)=0.83 for aggregation level 1. In another example, a 72-bit MIMO DCI has a coding rate of 1. Such high coding rate may make it difficult to decode the control channel, and therefore may make lower aggregation levels (e.g., aggregation level 1) less likely to be used. Limiting the use of aggregation level 1, however, can increase UE complexity and compromise eNB control channel scheduling flexibility.

According to certain aspects of the present disclosure, devices in a wireless communication network (e.g., eNB, UE, etc.) may support modulation orders higher than QPSK for control channels. As described in more detail below, the devices may determine whether to use the higher modulation order based on one or more conditions. In some aspects, the one or more conditions may be based on one or more parameters associated with DCI that is transmitted within the control channels.

FIG. 7 illustrates example operations 700 for wireless communications, in accordance with certain aspects of the present disclosure. The operations 700 may be performed by a UE, such as any one of UE 102, UE 206, UE 650, etc.

The operations 700 begin at 702, by the UE determining, based on one or more conditions, a maximum modulation order for a wireless device to transmit at least one control channel. According to certain aspects, the wireless device may be a base station, or another UE (e.g., as part of device-to-device communication). At 704, the UE monitors for the at least one control channel transmitted by the wireless device at a modulation scheme with a corresponding modulation order at or below the determined maximum modulation order.

FIG. 8 illustrates example operations 800 for wireless communications, in accordance with certain aspects of the present disclosure. The operations 800 may be performed by a wireless device (e.g., BS, UE, etc.,), such as any one of BS/eNBs or UEs illustrated in FIGS. 1-2 and 6.

The operations 800 begin at 802, by the wireless device determining, based on one or more conditions, a maximum modulation order for transmitting at least one control channel. At 804, the wireless device selects a modulation scheme with a corresponding modulation order at or below the determined maximum modulation order. At 806, the wireless device transmits the at least one control channel using the selected modulation scheme.

According to certain aspects, the one or more conditions may include an enabling/disabling indicator for a UE that indicates the maximum modulation order and/or the selected modulation scheme for transmitting control channel(s). In some cases, the UE may receive an explicit indication as to the maximum modulation order and/or the selected modulation scheme from the transmitting wireless device. In some cases, the indicator may be an implicit indication. For example, the UE may determine the maximum modulation order and/or the selected modulation scheme based on receipt of an indication of a modulation order used by a wireless device to transmit a data channel(s) (e.g., PDSCH). In some cases, the implicit indication may be based on whether the PDSCH is configured with 1024 QAM.

According to certain aspects, the one or more conditions may include use of a corresponding DCI format to transmit control information within the at least one control channel. For example, in certain cases, higher modulation orders (relative to QPSK) for transmitting control channel(s) may be supported for a subset of DCI formats available in the wireless communication system. In such cases, a first maximum modulation order (or a first set of modulation order or orders) may be determined for a first set of one or more DCI format(s), and a second maximum modulation order (or a second set of modulation order or orders) may be determined for a second set of DCI format(s). In one reference implementation, DCI formats 1A/1C/3/3A may be associated with QPSK, while other DCI formats may be configured to support higher modulation orders (e.g., 16 QAM, or higher).

According to certain aspects, the one or more conditions include whether a coding rate for transmitting control information in the at least one control channel exceeds a threshold. For example, in one aspect, once the BS and/or UE determine that a coding rate for a DCI size is at or exceeds a threshold, the BS and/or UE may determine that one or more decoding candidates of the control channel is modulated with a higher modulation order (e.g., 16 QAM) as opposed to QPSK. The UE, for example, may then demodulate the one or more decoding candidates of the control channel(s) using 16 QAM. Similarly, once the BS and/or UE determine that a coding rate for a DCI size is below a threshold, the BS and/or UE may determine that the control channel uses QPSK (e.g., as opposed to a higher modulation order). Referring to one example in which a threshold is set to 0.75, for decoding candidates with 36 REs, a BS and/or UE would determine that a DCI size of 54 bits or larger is based on 16 QAM; and that a DCI size of 53 bits or lower is based on QPSK.

According to certain aspects, the one or more conditions may be based on an indication of a control channel element (CCE) aggregation level used for the at least one control channel. For example, in some cases, aggregation level 1 may be associated with 16 QAM, while other aggregation levels may be associated with QPSK. The UE therefore, would monitor and/or demodulate control channel(s) based on the higher modulation order in search spaces in which aggregation level 1 is used (e.g., UE-specific search spaces). The BS may determine a decoding candidate with an aggregation level for a control channel transmission for a UE based on signal to interference plus noise ratio (SINR) conditions of the UE, for example, based on CQI report(s) received from the UE.

According to certain aspects, the one or more conditions may include a type of a control channel. For example, in one aspect, the UE may determine that control channels supporting low latency operation (with shortened TTI) use higher modulation orders (e.g., 16 QAM or higher), whereas other control channels (e.g., PDCCH, ePDCCH, mPDCCH, etc.) use QPSK.

According to certain aspects, the one or more conditions may be based on a search space in which the at least one control channel is transmitted. For example, the BS and/or UE may determine that one or more higher modulation orders are supported for control channel(s) transmitted in the UE-specific search space, and determine that QPSK modulation is used for control channel(s) transmitted in the common search space.

According to certain aspects, the one or more conditions may be based on a type of radio network temporary identifier (RNTI) used for the at least one control channel. For example, the BS and/or UE may determine that a DCI size of 70 bits may be associated with 16 QAM regardless of whether it is scrambled by semi-persistent scheduling (SPS) cell-RNTI (SPS C-RNTI) or C-RNTI.

Note that the UE and/or BS may determine a maximum modulation order for the transmission of control channel(s) based on any of the aspects described above or any combination of aspects described above. In some aspects, once the maximum modulation order is determined, the modulation scheme that is selected at or below the determined maximum modulation order may be based on one or more CQI/MCS tables. For example, as mentioned above, the UE may report a four bit CQI based on the observed SINR at the UE to another wireless device (such as a BS or another UE). The CQI may include information that indicates a suitable MCS value to the other wireless device. Once the other wireless device receives the CQI, the wireless device may determine a MCS to use for a transmission based on at least one of the CQI/MCS tables, determined maximum modulation order, etc.

According to certain aspects, the BS and/or UE may determine at least one traffic to pilot ratio (TPR) value, based at least in part on the selected modulation scheme. For example, in some cases, for decoding candidate(s) configured with higher modulation orders (e.g., 16 QAM or higher), a TPR may have to be defined. In some aspects, the TPR may be fixed at 0 decibels (dB). In some aspects, multiple TPR values may be supported (e.g., such as 0 dB, +3 dB, −3 dB, etc.). In such a case, the UE may determine a TPR value for a decoding candidate(s) based on an indication (e.g., from another wireless device) or via blind decoding. In some aspects, a same TPR value may be defined for all decoding candidates. In other aspects, different decoding candidates may be associated with different TPR values.

As mentioned above, in some cases, for data channels such as PDSCH, a UE may be configured to use a combination of 64 QAM based CQI/MCS table and 256 QAM based CQI/MCS table for different subframe sets. According to certain aspects presented herein, the UE may be configured to use a plurality of different combinations of CQI/MCS tables, where one or more of the CQI/MCS tables may be associated with higher modulation orders (e.g., 1024 QAM and greater).

FIG. 9 illustrates example operations 900 for wireless communications, in accordance with certain aspects of the present disclosure. The operations 900 may be performed by a UE, such as any one of UE 102, UE 206, UE 650, etc.

The operations 900 begin at 902, by the UE determining, based on at least three MCS tables, a first modulation scheme to use for communications with a wireless device for a first subset of subframes and a second modulation scheme to use for communications with the wireless device for a second subset of subframes. Each of the three MCS tables is associated with a different maximum modulation order. According to certain aspects, the wireless device may be a base station, or another UE (e.g., as part of device-to-device communication).

At 904, the UE monitors for a data channel transmitted in the first subset of subframes using the first modulation scheme. At 906, the UE monitors for a data channel transmitted in the second subset of subframes using the second modulation scheme.

FIG. 10 illustrates example operations 1000 for wireless communications, in accordance with certain aspects of the present disclosure. The operations 1000 may be performed by a wireless device (e.g., BS, UE, etc.,), such as any one of BS/eNBs 106, 108, 204, 610 or UEs 102, 206, 650 illustrated in FIGS. 1-2 and 6.

The operations 1000 begin at 1002, by the wireless device selecting, based on at least three MCS tables, a first modulation scheme to use for communications with a UE for a first subset of subframes and a second modulation scheme to use for communications with the UE for a second subset of subframes. Each of the three MCS tables is associated with a different maximum modulation order. At 1004, the wireless device uses the first modulation scheme for transmitting a data channel in the first subset of subframes. At 1006, the wireless device uses the second modulation scheme for transmitting a data channel in the second subset of subframes.

According to certain aspects, the first modulation scheme may be determined from one of the three MCS tables, and the second modulation scheme may be determined from a different one of the three MCS tables. In one example, the first modulation scheme is based on 64 QAM, and the second modulation scheme is based on 1024 QAM. In one example, the first modulation scheme is based on 256 QAM, and the second modulation scheme is based on 1024 QAM.

For example, in some aspects, if 1024 QAM is supported for the data channel, and if the UE is configured with two different subframe sets, a first combination may specify that 64 QAM based table(s) are used for one set of subframes and that 256 QAM based table(s) are used for a second set of subframes. A second combination may specify that 64 QAM based table(s) are used for one set of subframes and that 1024 QAM based table(s) are used for a second set of subframes. A third combination may specify that 256 QAM based table(s) are used for one set of subframes and that 1024 QAM based table(s) are used for a second set of subframes.

Based on the particular combination used, a BS may use a first modulation scheme for transmitting a data channel in a first subset of subframes, and use a second modulation scheme for transmitting a data channel in a second subset of subframes. Similarly, a UE may monitor for a data channel transmitted in a first subset of subframes using a first modulation scheme, and monitor for a data channel transmitted in a second subset of subframes using a second modulation scheme.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures (e.g., FIGS. 7-10), those operations may be performed by any suitable corresponding counterpart means-plus-function components, e.g., such as those illustrated in FIG. 6. For example, means for determining, means for selecting, means for assigning, means for using, means for indicating, and/or means for evaluating, may include one or more processors and/or elements of the UE 650, such as controller/processor 659, TX processor 668, RX processor 656, etc., and one or more processors and/or elements of the eNB 610, such as controller/processor 675, TX processor 616, RX processor 670, etc. Additionally, means for determining, means for selecting, means for monitoring, means for transmitting, means for receiving, means for using, and/or means for indicating, may include one or more processors, transmitters, receivers, and/or other elements of the UE 650 and/or eNB 610 illustrated in FIG. 6.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications by a user equipment (UE), comprising:
   determining, based on at least three modulation and coding scheme (MCS) tables, a first modulation scheme to use for communications with a wireless device for a first subset of subframes and a second modulation scheme to use for communications with the wireless device for a second subset of subframes, wherein each of the three MCS tables is associated with a different maximum modulation order;
   determining, based on one or more conditions, a maximum modulation order for the wireless device to transmit control information within at least one control channel;
   decoding at least one data channel transmitted in the first subset of subframes using the first modulation scheme;
   decoding at least one data channel transmitted in the second subset of subframes using the second modulation scheme; and
   decoding at least one control channel transmitted by the wireless device at a third modulation scheme with a corresponding modulation order at or below the determined maximum modulation order.

2. The method of claim 1, wherein the first modulation scheme is determined from one of the three MCS tables, and wherein the second modulation scheme is determined from a different one of the three MCS tables.

3. The method of claim 2, wherein the first modulation scheme is based on 64 quadrature amplitude modulation (QAM), and wherein the second modulation scheme is based on 1024 QAM.

4. The method of claim 2, wherein the first modulation scheme is based on 256 quadrature amplitude modulation (QAM), and wherein the second modulation scheme is based on 1024 QAM.

5. The method of claim 1, wherein the one or more conditions comprise receipt of an indication of at least one of the maximum modulation order for the at least one control channel or the third modulation scheme.

6. The method of claim 1, wherein the one or more conditions comprise receipt of an indication of a modulation order used by the wireless device to transmit a data channel.

7. The method of claim 1, wherein the one or more conditions comprise use of a corresponding downlink control information (DCI) to transmit control information within the at least one control channel.

8. The method of claim 7, wherein the determining comprises:
   determining a first maximum modulation order for a first set of one or more DCI formats; and
   determining a second maximum modulation order for a second set of one or more DCI formats.

9. The method of claim 1, wherein the one or more conditions comprises whether a coding rate for transmitting control information in the at least one control channel exceeds a threshold.

10. The method of claim 1, wherein at least one of the conditions is based on an indication of a control channel element (CCE) aggregation level used for the at least one control channel.

11. The method of claim 1, wherein the one or more conditions comprise whether the UE is capable of receiving control channels that support low latency operation.

12. The method of claim 1, wherein the one or more conditions are based on at least one of a search space in which the at least one control channel is transmitted, or a type of radio network temporary identifier (RNTI) used for the at least one control channel.

13. The method of claim 1, further comprising:
   determining at least one traffic to pilot ratio (TPR) value for the at least one control channel, based at least in part on the third modulation scheme.

14. A method for wireless communications by a base station (BS), comprising:
   selecting, based on at least three modulation and coding scheme (MCS) tables, a first modulation scheme to use for communications with a user equipment (UE) for a first subset of subframes and a second modulation scheme to use for communications with the UE for a second subset of subframes, wherein each of the three MCS tables is associated with a different maximum modulation order;
   determining, based on one or more conditions, a maximum modulation order for transmitting control information within at least one control channel;
   selecting a third modulation scheme with a corresponding modulation order at or below the determined modulation order;
   transmitting a data channel in the first subset of subframes using the first modulation scheme;
   transmitting a data channel in the second subset of subframes using the second modulation scheme; and
   transmitting the control information within the at least one control channel using the third modulation scheme.

15. The method of claim 14, wherein the first modulation scheme is selected from one of the three MCS tables, and wherein the second modulation scheme is selected from a different one of the three MCS tables.

16. The method of claim 15, wherein the first modulation scheme is based on 64 quadrature amplitude modulation (QAM), and wherein the second modulation scheme is based on 1024 QAM.

17. The method of claim 15, wherein the first modulation scheme is based on 256 quadrature amplitude modulation (QAM), and wherein the second modulation scheme is based on 1024 QAM.

18. The method of claim 14, further comprising:
indicating, to one or more UEs, at least one of the maximum modulation order for the at least one control channel or the third modulation scheme.

19. The method of claim 14, wherein the one or more conditions comprise a corresponding downlink control information (DCI) format used to transmit control information within the at least one control channel.

20. The method of claim 19, wherein the determining comprises:
determining a first maximum modulation order for a first set of one or more DCI formats; and
determining a second maximum modulation order for a second set of one or more DCI formats.

21. The method of claim 14, wherein the one or more conditions comprises whether a coding rate for transmitting control information in the at least one control channel exceeds a threshold.

22. The method of claim 14, wherein the one or more conditions is based on a control channel element (CCE) aggregation level used for the at least one control channel.

23. The method of claim 14, wherein the one or more conditions comprise whether the at least one control channel supports low latency operation.

24. The method of claim 14, wherein the one or more conditions are based on a search space in which the at least one control channel is transmitted.

25. The method of claim 14, wherein the one or more conditions are based on a type of radio network temporary identifier (RNTI) used for the at least one control channel.

26. The method of claim 14, further comprising:
determining at least one traffic to pilot ratio (TPR) value, based at least in part on the third modulation scheme.

27. An apparatus, comprising:
at least one processor configured to:
determine, based on at least three modulation and coding scheme (MCS) tables, a first modulation scheme to use for communications with another apparatus for a first subset of subframes and a second modulation scheme to use for communications with the other apparatus for a second subset of subframes, wherein each of the three MCS tables is associated with a different maximum modulation order;
determine, based on one or more conditions, a maximum modulation order for the wireless device to transmit control information within at least one control channel;
decode at least one data channel transmitted in the first subset of subframes using the first modulation scheme;
decode at least one data channel transmitted in the second subset of subframes using the second modulation scheme; and
decode at least one control channel transmitted by the wireless device at a third modulation scheme with a corresponding modulation order at or below the determined maximum modulation order; and
a memory coupled to the at least one processor.

28. An apparatus, comprising:
at least one processor configured to:
select, based on at least three modulation and coding scheme (MCS) tables, a first modulation scheme to use for communications with another apparatus for a first subset of subframes and a second modulation scheme to use for communications with the other apparatus for a second subset of subframes, wherein each of the three MCS tables is associated with a different maximum modulation order;
determine, based on one or more conditions, a maximum modulation order for transmitting control information within at least one control channel;
select a third modulation scheme with a corresponding modulation order at or below the determined modulation order;
output a data channel for transmission in the first subset of subframes using the first modulation scheme;
output a data channel for transmission in the second subset of subframes using the second modulation scheme; and
output the control information within the at least one control channel for transmission using the third modulation scheme; and
a memory coupled to the at least one processor.

* * * * *